United States Patent [19]

van der Lely et al.

[11] 4,056,147
[45] *Nov. 1, 1977

[54] ROTARY HARROWS

[75] Inventors: Ary van der Lely, Maasland; Cornelis Johannes Gerardus Bom, Rozenburg, both of Netherlands

[73] Assignee: C. van der Lely N. V., Maasland, Netherlands

[*] Notice: The portion of the term of this patent subsequent to Aug. 12, 1992, has been disclaimed.

[21] Appl. No.: 604,243

[22] Filed: Aug. 13, 1975

Related U.S. Application Data

[63] Continuation of Ser. No. 436,956, Jan. 28, 1974, abandoned, which is a continuation of Ser. No. 283,337, Aug. 24, 1972, abandoned.

[30] Foreign Application Priority Data

Aug. 31, 1971 Netherlands .......................... 7111947

[51] Int. Cl.² .................. A01B 33/06; A01B 33/16
[52] U.S. Cl. ........................... 172/68; 172/552

[58] Field of Search ............... 172/59, 63, 68, 110, 172/111, 175, 179, 184, 552, 537

[56] References Cited

U.S. PATENT DOCUMENTS

| 1,135,363 | 4/1915 | Currie | 172/552 |
| 1,801,923 | 4/1931 | Kella | 172/552 X |

FOREIGN PATENT DOCUMENTS

| 108,221 | 10/1967 | Denmark | 172/184 |
| 6,908,785 | 12/1970 | Netherlands | 172/59 |
| 6,807,548 | 12/1969 | Netherlands | 172/59 |
| 6,706,636 | 11/1968 | Netherlands | 172/59 |
| 487,576 | 5/1970 | Switzerland | 172/110 |

Primary Examiner—Paul E. Shapiro
Attorney, Agent, or Firm—Mason, Mason & Albright

[57] ABSTRACT

A harrow has a frame and power driven soil-working members on the frame mounted in a row. A roller is connected to the frame to trail the soil-working members. The roller includes a central tube-like support which is surrounded by elongated bars held in position by upright supports.

10 Claims, 3 Drawing Figures

ROTARY HARROWS

This application is a continuation of Ser. No. 436,956 filed Jan. 28, 1974, as a continuation of Ser. No. 283,337 filed Aug. 24, 1972, both now abandoned.

According to the invention there is provided a harrow of the kind set forth, wherein behind the said soil working members a roller is provided comprising a number of bars which are arranged at a distance from a central tube-like support.

Figure 1:
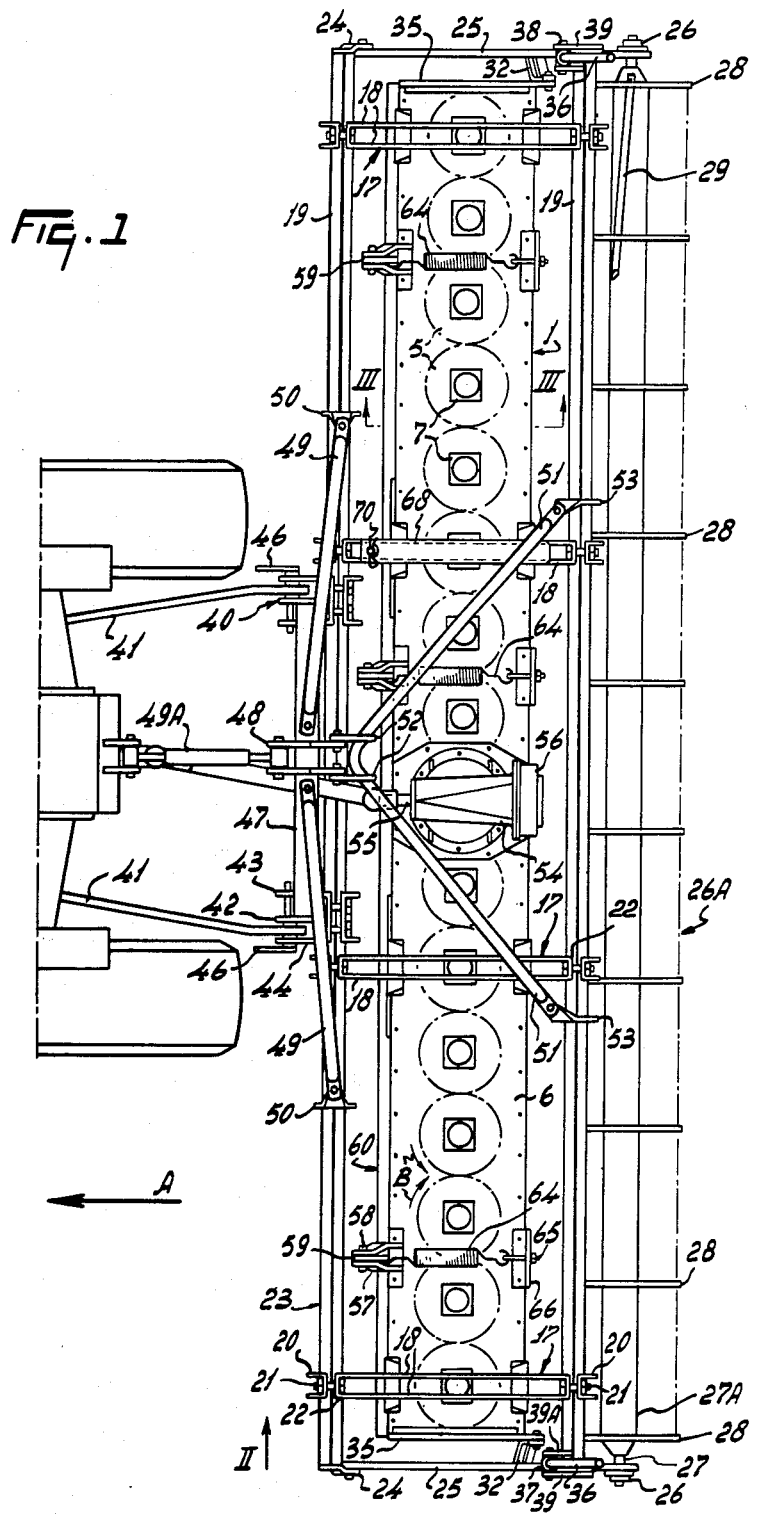
Figure 2:
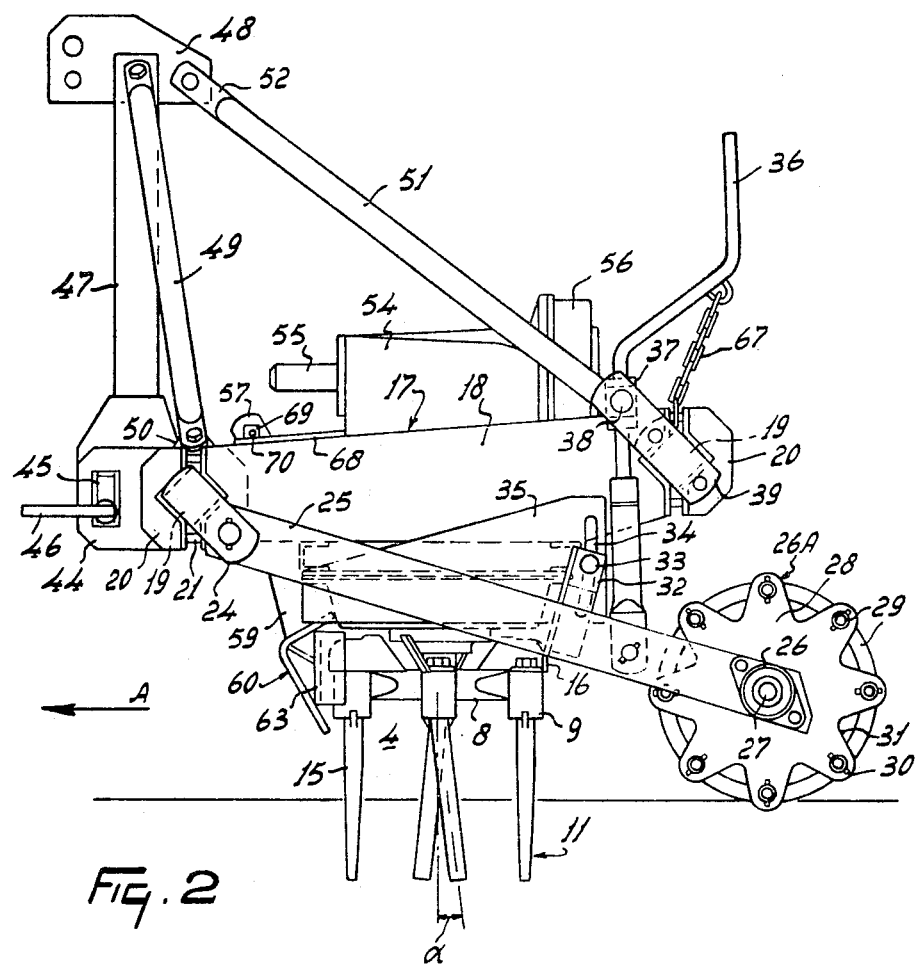
Figure 3:
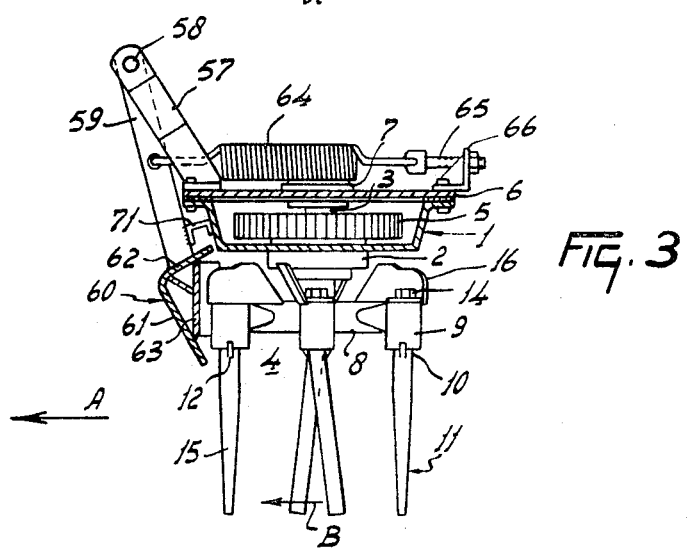

For a better understanding of the invention, and to show how the same may be carried into effect, reference will now be made, by way of example, to the accompanying drawings, in which:

FIG. 1 is a plan view of a cultivating implement or rotary harrow in accordance with the invention mounted at the rear of an agricultural tractor, FIG. 2 is a side elevation, to an enlarged scale, as seen in the direction indicated by an arrow II in FIG. 1, and FIG. 3 is a section, to an enlarged scale, taken on the line III—III of FIG. 1.

Referring to the drawings, the soil cultivating implement or rotary harrow which is illustrated includes a main frame part 1 of hollow box-like configuration that extends substantially horizontally perpendicular to the intended direction of operative travel of the harrow which is indicated by an arrow A in each Figure of the drawings. The bottom of the main frame part 1 is provided with a plurality of regularly spaced apart substantially vertical bearings 2 of which there are 16 in the example that is being described. Each bearing 2 receives a corresponding substantially vertical rotary shaft 3 which is provided, at its lower end, with a corresponding soil working member that is generally indicated by the reference 4. The sixteen rotary shafts are arranged in a single row that extends substantially perpendicular to the direction A and it is preferred that the axis of rotation of each shaft 3 should be spaced from that of its neighbour, or each of its neighbours, by a distance of substantially 25 centimeters. It will, of course, be realised that it is not essential that there should be 16 soil working working members 4 and it is within the scope of the invention to employ other numbers of such members to provide cultivators of different working widths.

Each shaft 3 is provided, inside the hollow main frame part 1, with a corresponding spur-toothed pinion 5, the sixteen pinions 5 being arranged in inter-meshing engagement in the manner which can be seen in outline in FIG. 1 of the drawings. A substantially horizontal plate 6 affords the top of the main frame part 1 and is releasably secured to the remainder of said part 1 by bolts with the provision of an intervening gasket so as substantially completely to close off the interior of said part 1 and prevent contamination of the lubricant contained therein by external dirt. The plate 6 is provided with sixteen substantially vertical bearings 7 that are mounted in openings in the plate in substantially vertical alignment with corresponding bearings 2. The upper ends of the sixteen shafts 3 are rotatably received in the bearings 7. Each soil working member 4 comprises a corresponding substantially horizontal support 8 secured centrally to the lowermost end of the corresponding shaft 3 that projects from beneath the corresponding bearing 2. The opposite ends of each support 8 carry substantially vertical tine holders 9 whose axes extend parallel to the axes of rotation of the shafts 3. Each holder 9 receives an upper fastening portion 10 of a corresponding rigid tine 11. In order to prevent the tines 11 from turning in their holders 9, the fastening portions 10 thereof are provided with at least one laterally projecting lug or rib 12 that is lodged in a corresponding groove or recess at the foot of the tine holder 9 concerned. The upper end of the fastening portion 10 of each tine 11 is screw-threaded and receives a nut 14 by which the tine can be clamped securely, but releasably, in its holder 9. It is greatly preferred that the nuts 14 should incorporate nylon or other thread-gripping inserts designed to prevent them from being worked loose by vibration during the use of the harrow.

In addition to its fastening portion 10, each tine 11 has a lower straight soil working portion 15 which is inclined upwardly and forwardly from its lowermost free end or tip to its junction with the fastening portion 10 with respect to the intended direction of rotation of the soil working member 4 concerned which is indicated by an arrow B in FIG. 3 of the drawings and also by further arrows B in FIG. 1. The arrangement is thus such that the soil working portions 15 normally trail somewhat with respect to the direction B but the form of co-operation between the soil working portions 10 and the holders 9 is preferably such that each tine 11 can be turned through 180° in its holder 9 and be re-secured in an alternative position in which its soil working portion 15 leads, rather than trails, with respect to the direction B. The angular junctions between the fastening portions 10 and soil working portions 15 of the tines 11 are all of equal magnitude and are preferably such that an angle α of substantially 8° is enclosed between the longitudinal axes of the two portions of each tine (FIG. 2).

Each fastening portion 10 is of an angular cross-section which is such that diagonals taken between opposite angles of the cross-section are of substantially equal lengths. The soil working portions 15 are also of a square or other angular cross-section which is such that diagonals taken between opposite angles of the cross-section are of substantially equal lengths at or near the uppermost end of each portion 15. However, as can be seen in FIGS. 2 and 3 of the drawings, the portions 15 progressively change in shape in a downward direction towards their free ends or tips in such a way that cross-sectional diagonals taken in directions tangential to circles centered upon the axes of rotation of the shafts 3 remain substantially unchanged while cross-sectional diagonals taken in directions that extend substantially radially of the axes of rotation of the shafts 3 progressively shorten in length towards the lowermost ends of the portions 15 to an extent such that their magnitude is substantially half the magnitude of the "tangential" diagonals in the region of the lowermost ends. The flat side surfaces of the soil working portions 15 that extend between the preferred number of four angles thereof are formed with grooved recesses that are not visible in the drawings, said grooved recesses extending downwardly to the free ends or tips of the portions 15 from their junctions with the fastening portions 10. The rigidity of the soil working portions 15 is sufficient to ensure that they do not become bent and their particular construction and normally trailing arrangement with respect to the direction B ensures that the soil is well broken up during a cultivating operation without becoming excessively displaced in position.

A plate 16 is provided at the top of each tine holder 9 and is inclined to the vertical in an upward and forward direction with respect to the intended direction of rotation B. the plates 16 which are slightly bent shield the tine fastening nuts 14 from being struck by sharp flying stones and the like during the operation of the harrow and their disposition is such that any stone or the like which strikes the leading surface of one of them is urged in a generally downward direction towards the ground surface. Four supports 17 that extend substantially parallel to the direction A are provided on top of the main frame part 1 at equal distances apart from one another across the width of the harrow with the central pair of the two supports spaced at opposite lateral sides from the midpoint of the main frame part 1. Each support 17 includes two vertically disposed and laterally spaced plates 18 that are formed at both their leading and rear ends, with respect to the direction A, with angular recesses in which fit matchingly profiled beams 19 of angular cross-section. The two beams 19 both extend substantially horizontally perpendicular to the direction A. Transverse members 22 of angular crosssection extend between the recesses in the plates 18 at the front and at the rear of those plates and the detachable beams 19 are urged into the recesses and against the transverse members 22 by clamps 20 that are retained in their clamping positions by bolts 21. Each beam 19 is parallel to a substantially horizontal line that interconnects the axes of rotation of all of the shafts 3 and has a length in a horizontal direction perpendicular to the direction A which is as great as the total working width of the harrow, that is to say, the combined working width of the sixteen soil working members 4 which members work overlapping strips of ground. The rearmost of the two beams 19 is located at a higher horizontal level than the foremost one and the supports 17 and beams 19 together afford a supporting structure 23 that is located generally above the main frame part 1. The two ends of the leading beam 19 are provided with lugs 24 which are inclined downwardly, and rearwardly with respect to the direction A, from the leading beam 19. The lowermost and rearmost ends of the two lugs 24 are connected by horizontal pivot pins that define an axis extending substantially perpendicular to the direction A to the leading ends of corresponding arms 25 that are inclined downwardly from the lugs 24 and rearwardly with respect to the direction A. The rearmost end of each arm 25 carries a horizontal bearing 26 and the two bearings 26 receive stub shafts 27 at the opposite ends of a rotary soil compressing member in the form of a roller 26A. The stub shafts 27 project from the opposite ends of a central tube 27A of the roller 26A, said tube 27A being provided at its opposite ends and at regular intervals along its length with a plurality, such as ten, of substantially vertically disposed plates 28 whose shapes can be seen best in FIG. 2 of the drawings. Each plate 28 has its plane disposed perpendicular to the axis of rotation defined by the two stub shafts 27.

The plates 28 are formed, adjacent their peripheries, with a plurality of holes, such as eight, through which elongated tubular elements 29 are entered, said elements 29 being retained against appreciable longitudinal displacement with respect to the plates 28 by quickly releasable transverse pins 30 but it will be noted that the holes in the plates 28 receive the elements 29 with some degree of play so that the elements 29 can turn in these holes. As can be seen in FIG. 2 of the drawings, each plate 22 is formed with generally V-shaped recesses 31 between the portions thereof that are formed with the holes receiving the elongated tubular elements 29. It can be seen from the drawings that the elements 29 extend helically around the axis of rotation of the roller 26A that is afforded by the stub shafts 27 and that, with the eight elements 29 that are illustrated, said elements are offset from one another around the axis of rotation of angles of substantially 45°. Each of the two arms 25 carries a corresponding upwardly directed bracket 32 whose upper end carries a transverse bolt 33 that passes through an arcuate slot 34 in a substantially vertical plate 35 fastened to the corresponding end of the main frame part 1. The two bolts 33 are both provided with nuts and the arcuate slots 34 have their center of curvature in register with the pivotal connections between the arms 25 and the lugs 24. The nuts and bolts 33 constitute locking devices for the level of the roller 26A relative to the remainder of the harrow in combination with the arcuate slots 34 in the plates 35. Immediately to the rear of each bracket 32, each arm 25 is connected by a corresponding horizontal pivot pin to the lowermost end of the housing of a screw-threaded cranked spindle 36 which has a plain portion of its shank rotatably but substantially axially immovably received in a block 37 that is turnably mounted by trunnion pins 38 between two supports 39 and 39A that project upwardly and forwardly with respect to the direction A from opposite end regions of the rearmost of the two beams 19 of the supporting structure 23.

The front of the leading beam 19 of the supporting structure 23 is provided with coupling means 40 intended for connection to the lower lifting links 41 of a three-point lifting device or hitch at the rear of an agricultural tractor or other operating vehicle. The coupling means 40 include vertical plates 42 flanked on opposite sides by further vertical plates 43 and 44. Each of the plates 42, 43 and 44 is formed with a substantially vertically extending slot 45 and horizontal pins 46 can be retained in positions in which they extend through the respective sets of slots 45 to establish the necessary pivotal connections with the lifting links 41. Different standard widths between the rearmost ends of different lower lifting links 41 are met with but the coupling means 40 will accommodate the links 41 either between the plates 42 and 44, as illustrated, or between the plates 42 and 43 depending upon the particular lifting device or hitch with which the harrow has to co-operate. The plates 42, 43 and 44 are mounted at the foot of a generally triangular coupling member or tripod 47 whose apex carries coupling means 48 in the form of a pair of vertically disposed but horizontally spaced apart plates formed with holes of different sizes to receive a transverse pin establishing a pivotal connection with the adjustable upper lifting link 49A of the three-point lifting device or hitch to which the harrow is connected in the use thereof.

The coupling member or tripod 47 is of the previously mentioned conventional generally triangular shape and its apex is connected by tie rods 49 with brackets 50 fastened to the leading one of the two beams 19 with respect to the direction A. A further generally V-shaped strengthening support 51 is arranged between lugs 52 that project rearwardly from the coupling means 48 and brackets 53 secured to the rearmost beam 19 of the supporting structure 23 with respect to the direction A, the generally V-shaped support 51 being entered through openings in the lugs 52 at locations adjacent the point of the V. The coupling member or tripod 47, the tie rods 49 and the strengthening support 51 are all mounted in their operative positions with the aid of nuts and bolts so that they can readily be removed from the positions indicated in the drawings when required.

The shaft 3 of one of the central pair of soil working members 4 of the single row of 16 such members has an upward extension, beyond the corresponding bearing 7, into a gear box 54. The shaft extension, which is not visible in the drawings, is in driven connection with a forwardly projecting splined or otherwise keyed rotary input shaft 55 by way of a change-speed gear assembly 56 that is mounted at the rear of the gear box 54 with respect to the direction A. It is not necessary to describe the change-speed gear assembly 56 in detail for the purpose of the present invention but its purpose is to enable different speeds of rotation of the shafts 3 to be chosen in response to a single input speed of rotation of the shaft 55 and this is accomplished by selecting corresponding arrangements of toothed pinions (not visible) that form part of the assembly 56. The forwardly projecting rotary input shaft 55 can be placed in driven connection with the power take-off shaft of the tractor or other operating vehicle to whose three-point lifting device or hitch the coupling member or tripod 47 is connected in the use of the implement in the manner which can be seen in outline in FIG. 1 of the drawings employing a known intermediate telescopic transmission shaft having universal joints at its opposite ends.

Pairs of lugs 57 which are inclined upwardly and forwardly with respect to the direction A are provided at the front of the main frame part 1, said pairs of lugs 57 being spaced inwardly from the opposite ends of the main frame part 1 by distances which are preferably, as illustrated, equal to the working widths of two of the soil working members 4. Each pair of lugs 57 has a corresponding arm 59 pivotally connected to its leading upper end by a pin 58 that lies above the frame part 1 and extends substantially horizontally perpendicular to the direction A. The arms 59 extend generally downwards from the pins 58 and their lower ends have a single screening element 60 welded or otherwise rigidly secured to them. The screening element 60 extends substantially horizontally perpendicular to the direction A and its lowermost edge is located at a horizontal level below that of the bottoms of the tine holders 9. The element 60 is of angular cross-section and includes a lower portion 61 that extends upwardly and forwardly with respect to the direction A from its lower edge, said portion 61 merging by way of a bend of substantially 90° into an upper portion 62 that is inclined upwardly and rearwardly with respect to the direction A away from said bend towards its upper edge. A substantially vertically disposed strip 63 interconnects the rear surfaces of the two portions 61 and 62 of the screening element 60 and has its opposite lateral ends bent over rearwardly in the manner which can be seen in FIGS. 2 and 3 of the drawings. Helical tension springs 64 have their leading ends connected to the arms 59 at locations approximately midway between the pivot pins 58 and the screening element 60 to which both arms are secured. The springs 64 are disposed above the main frame part 1 so as to extend substantially parallel to the direction A and their rearmost ends are connected by hooks to adjusters 65 having nuts which bear against brackets 66 bolted to the top and rear of the main frame part 1. It will be evident from FIGS. 1 and 3 of the drawings that the nuts forming parts of the adjusters 65 can be tightened or loosened to increase or decrease the degree of tension of the corresponding springs 64.

In the use of the harrow which has been described, its coupling member or tripod 47 is connected to the lifting links 41 and 49A of a three-point lifting device or hitch carried by an agricultural tractor or other operating vehicle in the manner which has been described and illustrated and the tines 11 penetrate into, and break up, the soil over which the harrow is passing as it moves operatively over a field in the direction A. The soil working members 4 are rotated in the directions B by power derived from the operating tractor or other vehicle through the intermediary of the gear box 54, the change-speed gear assembly 56 and the spur-toothed pinions 5. The soil working portions 15 of the tines 11 are normally arranged to trail with respect to the directions of rotation B as has been described and their depths of penetration into the ground surface are dictated primarily by the vertical setting of the roller 26A relative to the remainder of the harrow. Each soil working member 4 works a corresponding strip of land which preferably has a width of substantially 30 centimeters and, since the shafts 3 are spaced apart from one another by distances of substantially 25 centermeters, the individual strips of land overlap one another to form a single broad strip of worked soil having a width of substantially 405 centermeters.

When the working depths of the tines 11 are to be changed, the bolts 33 are loosened and the cranked spindles 36 are rotated in appropriate directions by hand to turn the arms 25 upwardly or downwardly about their pivotal connections with the lugs 24 as may be required. The bolts 33 are re-tightened once the desired setting of the roller 26A has been attained and it will be noted from FIG. 2 of the drawings that chains 67 are provided for releasable connection to eyes on the handles of the cranked spindles 36 in order positively to ensure that said spindles 36 do not rotate to alter the setting of the roller 26A during the operation of the harrow even if one or both of the bolts 33 should work loose. The helical disposition of the elongated tubular elements 29 ensures a smooth substantially jerk-free progress of the roller 26A over the ground and makes it possible temporarily to remove certain of the elements, for example every second element, in the event that very heavy and/or sticky soil is being dealt with under which conditions there is a tendency for the hollow interior of the roller 26A to become filled with mud and clods of earth. When, for example, there are only four of the elements 29 present in regularly spaced apart relationship, such tendency is greatly reduced. The supporting structure 23 that is provided on top of the main frame part 1 enables an effective arrangement of the coupling member or tripod 47 and its associated parts to be attained without subjecting the main frame part 1 itself to any substantial forces that would tend permanently to deform it. When other agricultural implements, such as seed drills or planting machines, are to be used in combination with the harrow, such implements can conveniently be secured to the rearmost one of the two beams 19 which beam is located at a higher horizontal level than the other leading beam 19.

There are spaces inside the supports 17 between the vertical plates 18 thereof and, by closing the openings between the bottoms and tops of those plates 18, one of said spaces can be used as a storage compartment for spanners and other tools that are to be employed for the adjustment and routine maintenance of the harrow. To this end, the space between the upper edges of the plates 18 of the compartment is provided with a cover 68 that is retained in place around a dowel 69 by a readily removable resilient pin 70 having one of its limbs entered through a transverse bore in the dowel 69.

The screening element 60 which is arranged in front of the soil working members 4 with respect to the direction A and which has the front surface of its lower portion 61 inclined downwardly and rearwardly with respect to said direction shields the bottom of the main frame part 1, the bearings 2, the supports 8 and the tine holders 9 from encountering any large stones which the tines 15 may meet during their passage through the soil so that damage from this cause is reduced to a minimum. The screening element 60 is pivotable about the axis defined by the pins 58 in a clockwise direction as seen in FIGS. 2 and 3 of the drawings against the action of the strong tension springs 64. Thus, should any smaller stones find their way between the tops of the soil working members 4 and the screening element 60, said screening element can deflect forwardly, without damage, until the obstacle has been pushed away whereupon the element 60 will snap back into the illustrated position in which its supporting arms 59 bear against stops 71 (FIG. 3) carried at the front of the main frame part 1. As previously mentioned, the implement has an overall working width of substantially 405 centermeters which may conveniently be considered as a working width of substantially 4 meters. Despite this large working width, the working depth of the tines 11 can readily be adjusted by means of the cranked spindles 36 located adjacent the opposite lateral ends of the main frame part 1 and roller 26A. A uniform working depth appropriate to the particular operating conditions can thus be obtained both quickly and easily.

Due to the fact that the beams 19 and the tripod 47 are detachable these beams and the tripod 47 can be removed so that after manufacturing the machine can be transported easily.

Although various features of the cultivating implement or harrow that has been described and/or illustrated in the accompanying drawings will be set forth in the following claims as inventive features, it is emphasised that the invention is not necessarily limited to those features and that it encompasses within its scope all of the parts of the harrow that has been described and/or illustrated in the accompanying drawings both individually and in various combinations.

What we claim is:

1. A harrow comprising a frame having coupling means connectable to the lift of a tractor and a plurality of rotatable soil-working members mounted on said frame in a row extending transverse to the direction of travel, said soil-working members comprising tines mounted for rotation about upwardly extending axes that are supported on an elongated part of said frame, an elongated roller coextending with said row and positioned at the rear thereof to trail behind said soil-working members, said frame depending from an elongated supporting structure that coextends with said frame and said structure comprising a front part and rear, forwardly extending arms adjacent the lateral ends of said structure said roller being connected to said arms, said arms being interconnected to the rear of said supporting structure by adjustment means for varying the position of said arms up and down relative to said supporting structure and the latter being connected to said arms intermediate their ends, locking means at the lateral ends of said frame part for locking said arms against movement relative to said supporting structure, and said locking means also being connected to said arms intermediate the ends thereof, said arms being pivotally connected to the front part of said supporting structure and being fixable in chosen angular setting about said pivot connections by said locking means, said roller including a central tube-like support and a plurality of rod-like elements being spaced from said tube-like support, said rod-like elements extending generally transverse to the direction of travel and being helically positioned with respect to the center line of said tube-like support, hole means on said roller for supporting said rod-like elements and means detachably mounting said rod-like elements in, said hole means.

2. A harrow as claimed in claim 1, wherein said locking means comprises each of said arms have a bracket and said frame having a slotted plate at each lateral end thereof, each bracket being bolted in the slot of its adjacent plate to lock said arms to said frame.

3. A harrow as claimed in claim 1, wherein said hole means comprise upright plates having holes therein, said plates extending substantially normal to the center line of said tube-like support and wherein said rod-like elements are loosely supported in said holes.

4. A harrow as claimed in clam 3, wherein there are eight tubular elements mounted on said roller concentric to said tube-like support.

5. A harrow as claimed in claim 4, wherein said upright plates includes upright plates which are located at spaced apart intervals from one another along the length of said tube-like support.

6. A harrow as claimed in claim 5, wherein there are ten upright plates and said means for detachably mounting said rod-like elements in said holes comprises apertures in each of said rod-like elements and pin in said apertures.

7. A harrow as claimed in claim 5, wherein said upright plates have V-shaped recesses around their peripheries between said holes.

8. A harrow as claimed in claim 1, wherein said rod-like elements are substantially circular in cross-section.

9. A harrow as claimed in claim 1, wherein said supporting structure includes a front beam and a rear beam, said arms being interconnected to said front and rear beams.

10. A harrow comprising a frame having coupling means connectable to the lift of a tractor and a plurality of rotatable soil-working members mounted on said frame in a row extending transverse to the direction of travel, said soil-working members comprising tines mounted for rotation about upwardly extending axes that are supported on an elongated frame part of said frame, an elongated roller coextending with said row and said roller being connected to said frame and positioned at the rear thereof to trail behind said soil-working members, said frame part depending from an elongated supporting structure and the latter comprising a front beam and a rear beam that coextend with said frame part, forwarding extending arms said roller being connected to said arms, said arms being connected to said rear beam by adjustment means for varying the position of said arms up and down relative to said supporting structure connected to said arms intermediate the ends thereof, locking means positioned adjacent the lateral ends of said frame part for locking said arms against movement relative to said supporting structure, and said locking means being connected to said arms being pivotally connected to the front part of said supporting structure and intermediate the ends thereof, said arms being fixable in chosen angular settings about their pivot connections to said frame by said locking means, said roller including a central tube-like support and a plurality of rod-like elements being spaced from said support, said rod-like elements extending generally transverse to the direction of travel and being helically positioned with respect to the center line of the said tube-like support, holes on said roller for supporting said rod-like elements and, means for detachably mounting said rod-like elements in said holes.

* * * * *